United States Patent
Beck et al.

(10) Patent No.: US 7,552,137 B2
(45) Date of Patent: Jun. 23, 2009

(54) METHOD FOR GENERATING A CHOOSE TREE FOR A RANGE PARTITIONED DATABASE TABLE

(75) Inventors: Kevin L. Beck, Portland, OR (US); Paul M. Brett, Portland, OR (US); Keith G. Billings, Portland, OR (US); Bingjie Miao, Tigard, OR (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 11/020,538

(22) Filed: Dec. 22, 2004

(65) Prior Publication Data

US 2006/0136480 A1 Jun. 22, 2006

(51) Int. Cl.
G06F 7/00 (2006.01)
G06F 17/00 (2006.01)
(52) U.S. Cl. .......................................... 707/102; 707/4
(58) Field of Classification Search ................ 707/1–10, 707/100–104.1, 200–206; 717/106, 118, 717/122, 136, 140, 141, 146, 159
See application file for complete search history.

(56) References Cited

U.S. PATENT DOCUMENTS

| 5,812,851 | A |  | 9/1998 | Levy et al. |
| 5,884,083 | A | * | 3/1999 | Royce et al. ................ 717/143 |
| 5,892,951 | A |  | 4/1999 | Safonov |
| 6,349,310 | B1 | * | 2/2002 | Klein et al. ................. 707/200 |
| 6,389,425 | B1 | * | 5/2002 | DeMichiel et al. .......... 707/102 |
| 7,158,984 | B2 | * | 1/2007 | Fairweather ................ 707/101 |
| 2002/0078436 | A1 |  | 6/2002 | Clarke |
| 2002/0095667 | A1 |  | 7/2002 | Archambault |
| 2004/0073913 | A1 |  | 4/2004 | Fairweather |

FOREIGN PATENT DOCUMENTS

GB 2 327 786 A * 3/1999

OTHER PUBLICATIONS

Choi et al., Scheduling on parallel processing systems using parallel primitives, Mar. 7-9, 1990, IEEE, 56-65.*
Lewis, D.M., Device model approximation using 2N trees, Jan. 1990, IEEE, vol. 9, 30-38.*
Fedotov et al., The estimated cost of a search tree on binary words, Jan. 2001, vol. 47, 326-329.*

* cited by examiner

*Primary Examiner*—Jean B Fleurantin
(74) *Attorney, Agent, or Firm*—Kunzler & McKenzie

(57) ABSTRACT

A choose tree is generated at compile time to facilitate a determination if any partition of a range partitioned database table includes a particular key at runtime. To generate the choose tree at compile time, a query compiler receives a source code indicative of each partition of the range partitioned database table, and generates the choose tree from the source code at compile time where the choose tree is representative of a pre-computed binary search of the range partitioned database table. Thereafter, the choose tree can be interpreted/executed at runtime to facilitate a traversal of the choose tree for determining if any partition of the range partitioned database table includes the particular key.

10 Claims, 10 Drawing Sheets

TABLE
31

| PARTITION | COLUMN 0 | |
|---|---|---|
| | STARTING VALUE | ENDING VALUE |
| PARTITION 0 | 1 | 20 |
| PARTITION 1 | 21 | 40 |
| PARTITION 2 | 41 | 60 |
| PARTITION 3 | 61 | 80 |
| PARTITION 4 | 81 | 100 |
| PARTITION 5 | 121 | ∞ |

DATABASE 30

**FIG. 1
(PRIOR ART)**

CREATE TABLE example(C0 INT) PARTITION BY RANGE(C0)
(PART 0 STARTING 1 ENDING 20,
PART 1 STARTING 21 ENDING 40,
PART 2 STARTING 41 ENDING 60,
PART 3 STARTING 61 ENDING 80,
PART 4 STARTING 81 ENDING 100,
PART 5 STARTING 121 ENDING MAXVALUE)

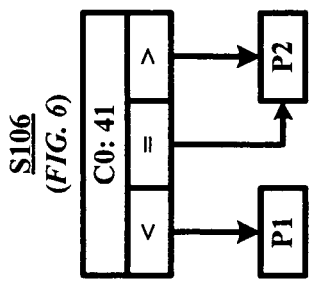
FIG. 8
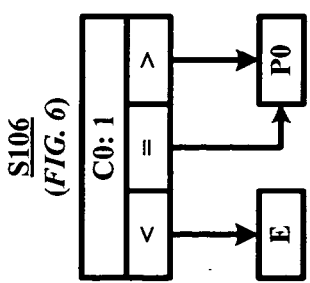
FIG. 9
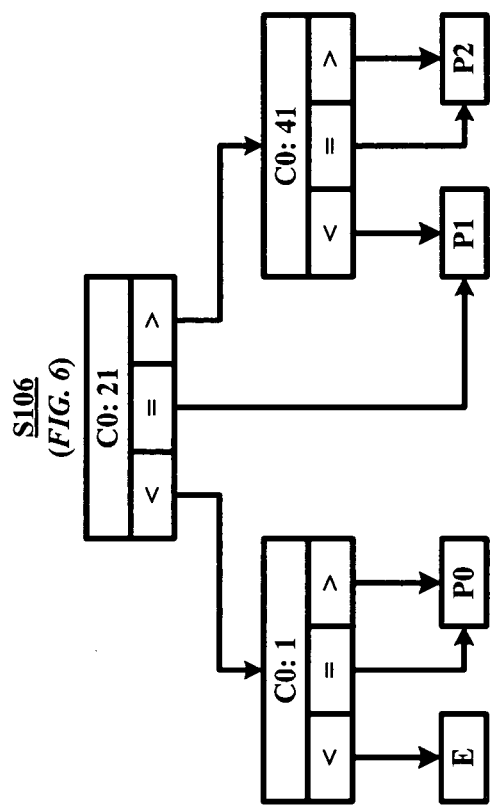
FIG. 10
FIG. 11

DATABASE
30

TABLE
32

| PARTITION | C0: YEAR | C1: MONTHS |
|---|---|---|
| PARTITION 0 | 2002 | 1 |
| PARTITION 1 | 2002 | 2 |
| PARTITION 2 | 2003 | 1 |
| PARTITION 3 | 2003 | 2 |
| PARTITION 4 | 2004 | 1 |
| PARTITION 5 | 2004 | 2 |

FIG. 17
(PRIOR ART)

```
CREATE TABLE MULTI_COL (YEAR INT, MONTHS INT)
    PARTITION BY (YEAR, MONTHS)
    (STARTING (2002,1),
     STARTING (2002,2),
     STARTING (2003,1),
     STARTING (2003,2),
     STARTING (2004,1),
     STARTING (2004,2) ENDING (2004,2));
```
⎫ 62

METHOD FOR GENERATING A CHOOSE TREE FOR A RANGE PARTITIONED DATABASE TABLE

FIELD OF INVENTION

The present invention generally relates to a locating a correct partition in a range partitioned database table. The present invention specifically relates to a pre-computation of a binary search of the range partitioned database table at query compilation time.

BACKGROUND OF THE INVENTION

FIG. 1 illustrates an exemplary database 30 storing a range partitioned database table 31 that is partitioned into six (6) one-column partitions. A partition 0 has a starting value of 1 and an ending value of 20. A partition 1 has a starting value of 21 and an ending value of 40. A partition 2 has a starting value of 41 and an ending value of 60. A partition 3 has a starting value of 61 and an ending value of 80. A partition 4 has a starting value of 81 and an ending value of 100. A partition 5 has a starting value of 121 and an ending value of infinity $\infty$. A hole (not shown) between partitions 4 and 5 has a starting value of 101 and an end value of 120.

A binary search of table 31 is performed whenever there is a need to determine which of the partitions 0-5 of table 31 a particular key falls in given the logical range of each partition 0-5. Specifically, a binary search of table 31 involves repeatedly dividing table 31 in two, and searching the half that is known to contain the key. For example, with the key being 42, table 31 would be initially divided in two with a first half of 1-80 and second half of 81-infinity, and an initial comparison of the key 42 to the two halves would result in a subsequent search of the first half 1-80 and a discarding of the second half 81-$\infty$. Thereafter, the first half 1-80 would be divided by two into a third half 1-40 and a fourth half 41-80, and a comparison of key 42 to the two halves would result in a discarding of the third half 1-40 and a subsequent search of the fourth half 41-80. Finally, the fourth half 41-80 would be divided by two into a fifth half 41-60 and a sixth half 61-80, and a comparison of key 42 to the two halves would result in a finding of key 42 in the fifth half 41-60, which is partition 2.

The exemplary binary search of table 31 would occur at runtime. As such, the processing time for performing the binary search of table 31 can be costly in terms of system performance, particularly in view of having to divide table 31 within the hole including logical range 101 to 120, or within partition 5 having an infinite end value. Moreover, the cost of performing the binary search of table 31 at runtime could significantly increase if table 31 had multiple columns.

A challenge therefore for the computer industry is to develop a technique for performing a binary search of a range partitioned database table (e.g., table 31) in a timely manner that does not considerably affect the overall performance of the system performing such a search of the range partitioned database table.

SUMMARY OF THE INVENTION

The present invention provides a new and unique query compiler for generating a choose tree in object code form or interpreted code form, where the choose tree is representative of a pre-computed binary search of a range partitioned database table.

One embodiment of the present invention is a signal bearing medium tangibly embodying a program of machine-readable instructions executable by a processor to generate the choose tree. The operations include receiving a source code indicative of each partition of a range partitioned database table; and generating the choose tree from the source code at compile time.

A second embodiment of the present invention is a system employing a processor, and a memory for storing instructions operable with the processor for generating the choose tree. The instructions being executed for receiving a source code indicative of each partition of a range partitioned database table; and generating the choose tree from the source code at compile time.

A third embodiment of the present invention is a computer for generating the choose tree. The computer includes means for receiving a source code indicative of each partition of a range partitioned database table; and means for generating the choose tree from the source code at compile time.

A fourth embodiment of the present invention is a method for generating the choose tree. The method includes receiving a source code indicative of each partition of a range partitioned database table; and generating the choose tree from the source code at compile time.

The foregoing embodiments of the present invention as well as other embodiments, objects, and aspects, as well as features and advantages, will become further apparent from the following detailed description of the various embodiments of the present invention, read in conjunction with the accompanying drawings. The detailed description and drawings are merely illustrative of the present invention, rather than limiting the scope of the present invention being defined by the appended claims and equivalents thereof.

BRIEF DESCRIPTION OF THE DRAWINGS

FIG. 1 illustrates a first exemplary range partitioned database table as known in the art;

FIGS. 8-15 illustrate an exemplary choose tree generation of the source code illustrated in FIG. 5 in accordance with the flowchart illustrated in FIG. 7;

FIG. 17 illustrates a second exemplary range partitioned database table as known in the art;

FIG. 18 illustrates an exemplary embodiment of a source code in accordance with the present invention that corresponds to the range partitioned database table illustrated in FIG. 17.

DETAILED DESCRIPTION OF THE PRESENT INVENTION

Figure 2:
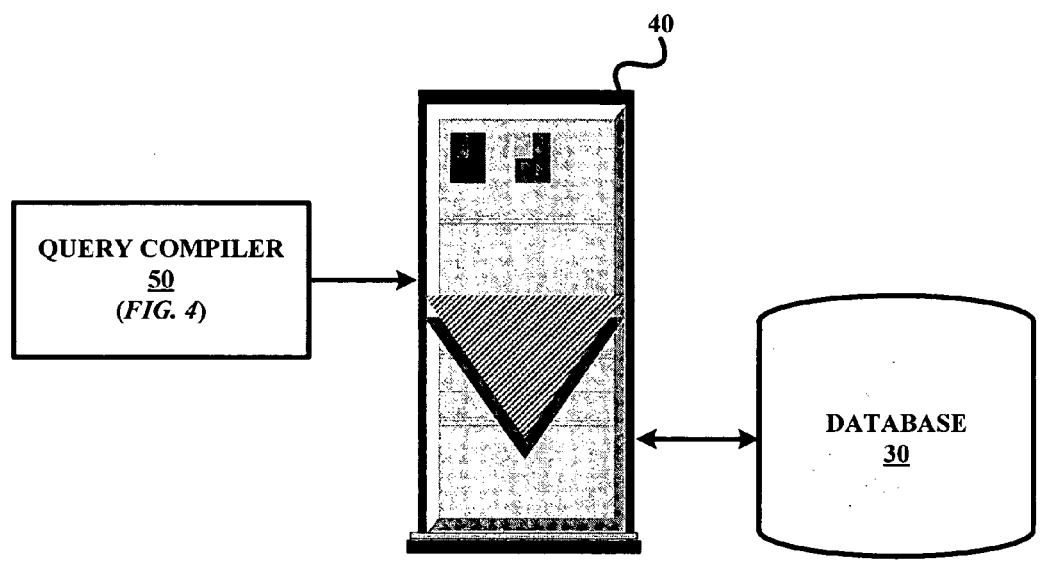
FIG. 2 illustrates one embodiment of a compiler system in accordance with the present invention.

FIG. 2 illustrates a compiler system of the present invention employing database 30, a conventional database server 40 for managing database 30, and a new and unique query compiler 50 embodied in a software module integrated with a commercially available compiler database manager for facilitating the management of database 30 by database server 40. As such, query compiler 50 is installed within a memory of a database server 40 whereby the processor of database server 40 can operate query compiler 50 to perform various methods of the present invention as exemplarily illustrated in FIGS. 3-19. Query compiler 50 as a software module can be written in any conventional programming language by those having ordinary skill in the art appreciating the description herein of FIGS. 3-19.

Figure 3:
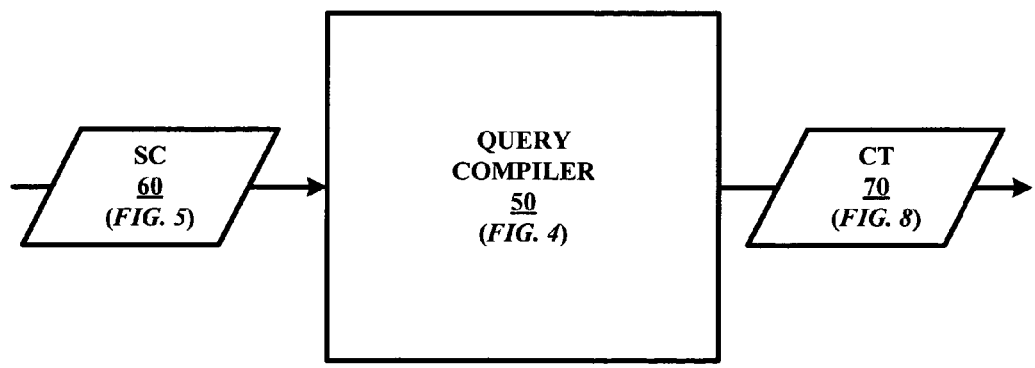
FIG. 3 illustrates one embodiment of a query compiler in accordance with the present invention.
Figures 4, 5:
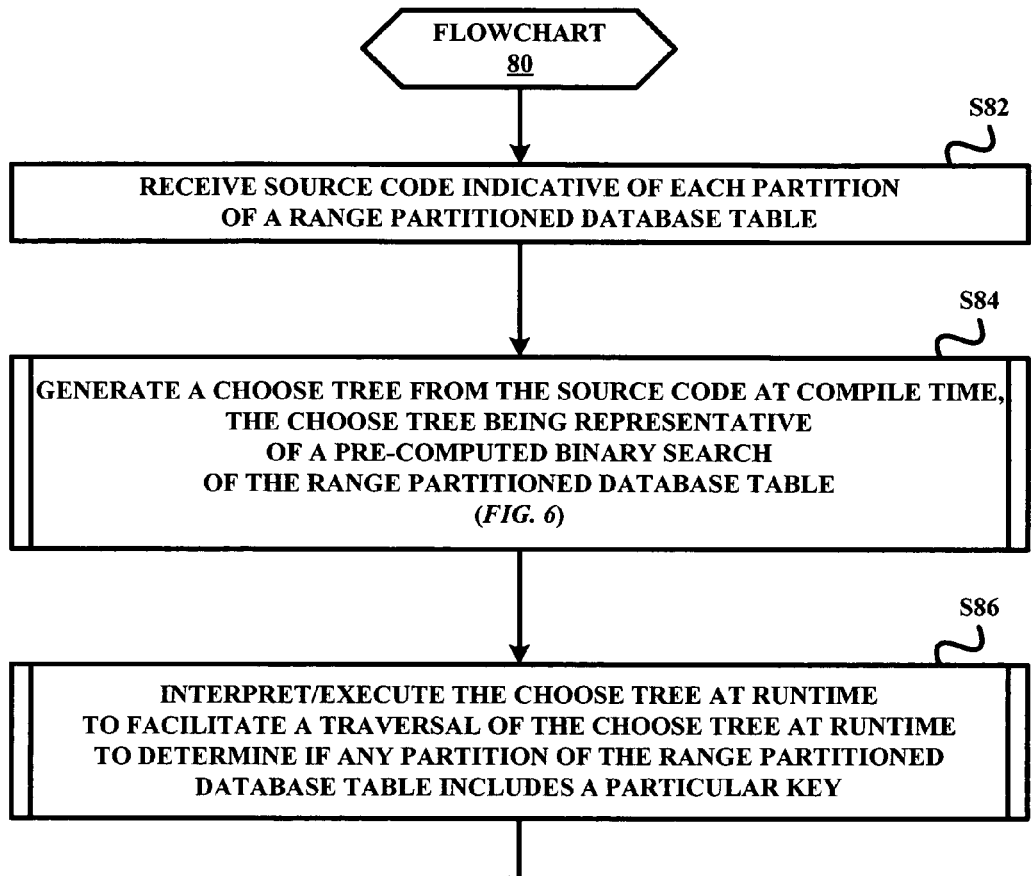
FIG. 4 illustrates a flowchart representative of a choose tree compilation method of the present invention.
FIG. 5 illustrates an exemplary embodiment of a source code in accordance with the present invention that corresponds to the range partitioned database table illustrated in FIG. 1.

In operation, server 40 utilizes query compiler 50 to execute a choose tree compilation method of the present invention as represented by a flowchart 80 illustrated in FIG. 4. Referring to FIGS. 3 and 4, a stage S82 of flowchart 80 encompasses query compiler 50 receiving a source code ("SC") 60 indicative of each partition of a range partitioned database table. For example, as illustrated in FIG. 5, a source code 61 is written to indicate each partition of range partitioned database table 31 (FIG. 1). Referring to FIGS. 1 and 5, the first code line indicates a starting value of 1 and an ending value of 20 for partition 0 of table 31. The second code line indicates a starting value of 21 and an ending value of 40 for partition 1 of table 31. The third code line indicates a starting value of 41 and an ending value of 60 for partition 2 of table 31. The fourth code line indicates a starting value of 61 and an ending value of 80 for partition 3 of table 31. The fifth code line indicates a starting value of 81 and an ending value of 100 for partition 4 of table 31. The last code line indicates a starting value of 121 and a maximum ending value (i.e., infinity) for partition 5 of table 31.

In practice, the manner by which source code of the present invention is written to indicate each partition of a range partitioned database table is without limit. Thus, the exemplary source code 61 as illustrated in FIG. 5 is not a limitation as to the scope of stage S82.

Referring again to FIGS. 3 and 4, a stage S84 of flowchart 80 encompasses query compiler 50 generating a choose tree ("CT") 70 from the source code at a compile time where choose tree 70 is representative of a pre-computed binary search of a range partitioned database table. For example, in the case of query complier receiving source code 61 (FIG. 5) corresponding to table 31 (FIG. 1) during stage S82, query compiler 50 will generate choose tree 70 from source code 61 at compile time during stage S84 where choose tree 70 is representative of a pre-computed binary search of table 31. A final stage S86 of flowchart 80 encompassing an interpretation/execution of the choose tree is discussed below.

In one embodiment of stage S84, query compiler 50 is operated as a compiler that translates source code 60 into object code that is compiled as choose tree 70.

In a second embodiment of stage S84, query compiler 50 is operated as an interpreter that translates the source code into an interpreted code that is executed as choose tree 70.

In practice, the manner by which query compiler 50 implements stage S84 is without limit. Thus, the following description of a source code translation method of the present invention is not a limitation to the scope of stage S84.

Figure 6:
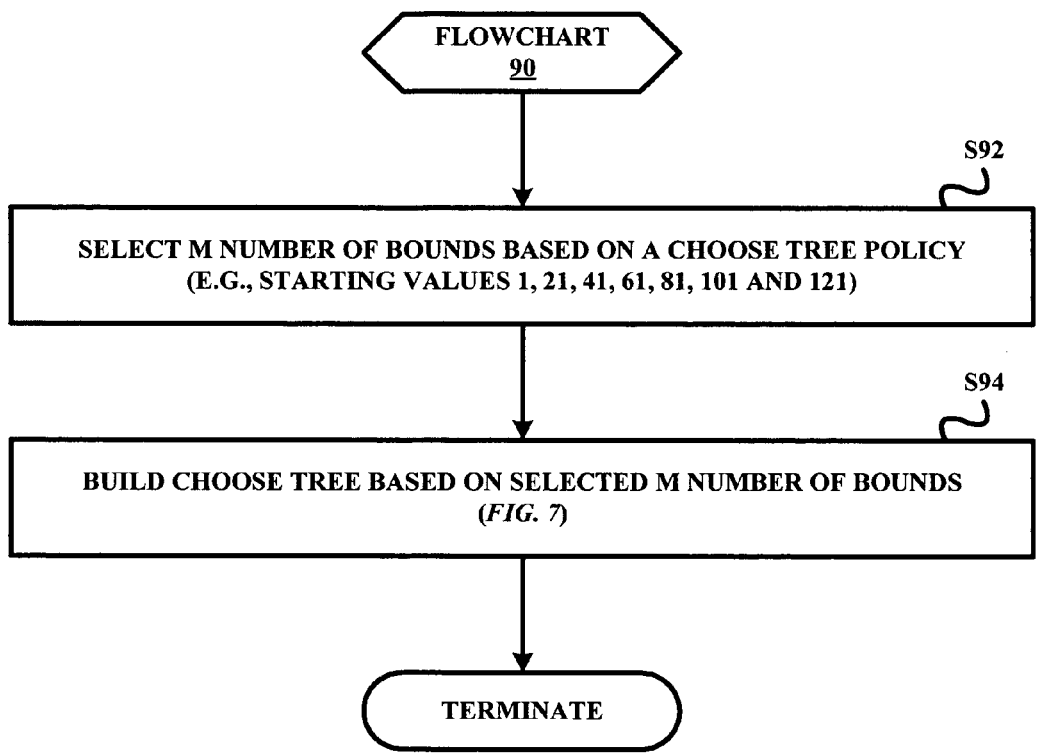
FIG. 6 illustrates a flowchart representative of a source code translation method in accordance with the present invention.

FIG. 6 illustrates a flowchart 90 that is representative of the source code translation method of the present invention that can be executed during stage S84 (FIG. 4). Referring to FIG. 6, a stage S92 of flowchart 90 encompasses query compiler 50 selecting M number of bounds based on a choose tree policy, where M≧1. In one embodiment, the choose tree policy requires query compiler 50 to select M number of bounds in view of balancing the choose tree to the greatest extent possible where each tree node contains a column number to compare, the value to compare against the key, and an action to take based on the comparison of the value to the key.

The choose tree policy further incorporates optimizations so that during query execution no redundant value comparisons are done. Specifically, each partition in a data partitioned table stores a value or a single range of values. Internally, the data structure describing each partition contains a starting value and an ending value for a low bound and a high bound, respectively, of the range stored in that partition. Each bound is either flagged as inclusive or exclusive. One reason for supporting both inclusive bounds and exclusive bounds is to allow partitions where only the high bound is specified and the low bound is implied by the high bound of the preceding partition, or vice-versa. Anytime a bound is implied in the source code, that bound is manufactured by compiler 50, which copies an adjacent bound and flips the inclusive/exclusive flag. For example, if the user has entered a high bound of 100 inclusive in the previous partition, then the implied low bound in this partition will be 100 exclusive.

Furthermore if the bound includes MINVALUE or MAXVALUE then that tree node can be optimized out of the tree. For MINVALUE, all values are greater than MINVALUE so the subtree that would be built under the greater than link replaces the tree node that would have been built for the MINVALUE bound. Similarly for MAXVALUE, all values are less than MAXVALUE so the subtree that would have been built for the less than link can be used to replace the tree node that would have been built for MAXVALUE.

Referring still to FIG. 6, a stage S94 of flowchart 90 encompasses query compiler 50 building the choose tree based on the selected M number of bounds. In practice, the manner by which query compiler 50 implements stage S94 is without limit. Thus, the following description of a choose tree generation method of the present invention is not a limitation to the scope of stage S94.

Figure 7:
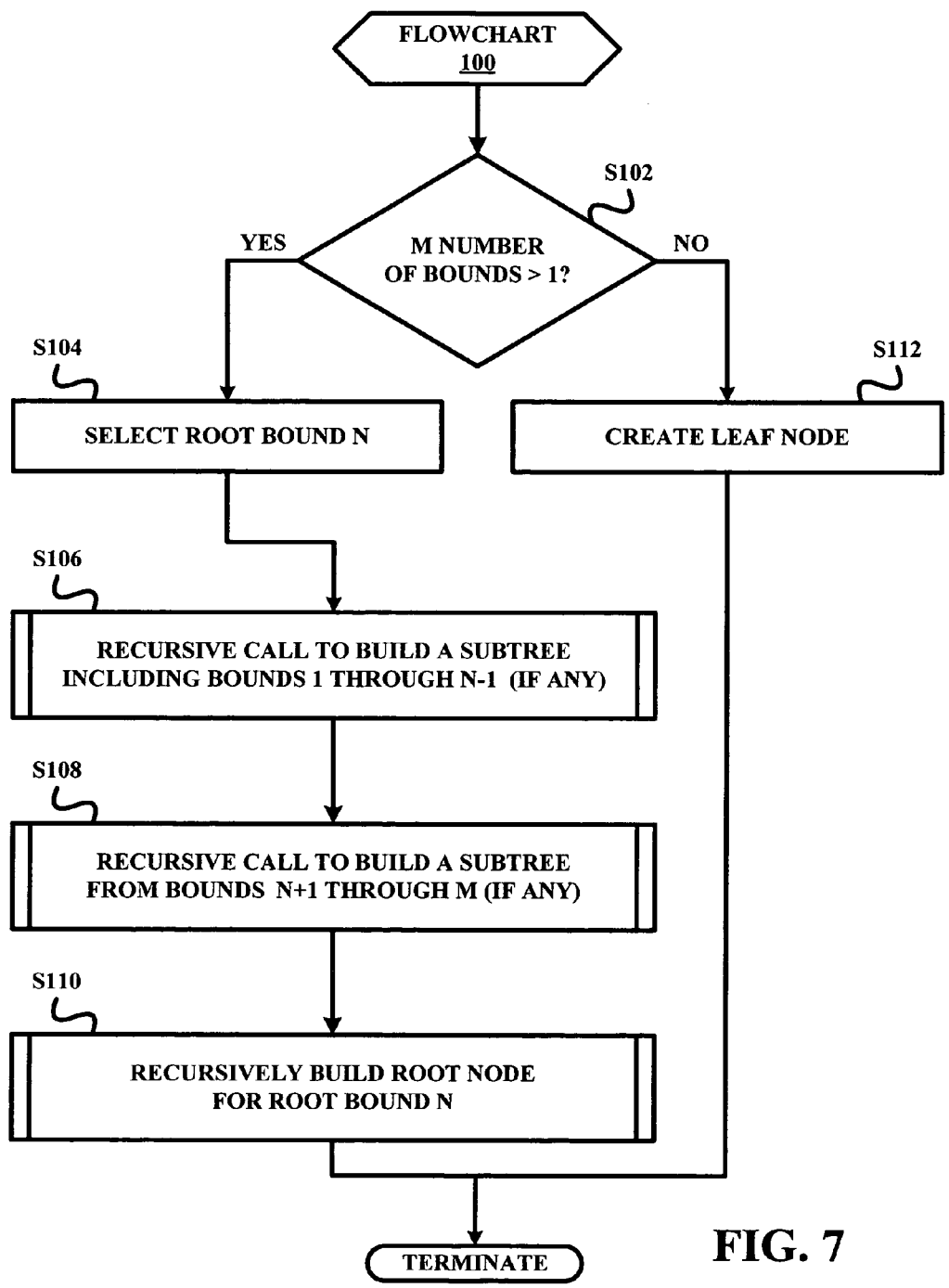
FIG. 7 illustrates a flowchart representative of a choose tree generation method in accordance with the present invention.

Referring to FIG. 7, a flowchart 100 is representative of a choose tree generation method of the present invention that can be executed during stage S94 (FIG. 6). To facilitate an understanding of flowchart 100, flowchart 100 will be described herein in the context of building a choose tree from source code 61 (FIG. 5) where starting values 1, 21, 41, 61, 81 101, and 121 are selected as the bounds of the choose tree during stage S92 (FIG. 6). Specifically, starting value 1 is bound 1, starting value 21 is bound 2, starting value 41 is bound 3, starting value 61 is bound 4, starting value 81 is bound 5, starting value 101 is bound 6, and starting value 121 is bound 7.

A stage S102 of flowchart 100 encompasses query compiler 50 determining if the M number of selected bounds is greater than one (1). In this case, the answer to stage S102 is YES, whereby query compiler 50 proceeds to a stage S104 of flowchart 100 to select a root bound N in accordance with the choose tree policy (S92). In one embodiment, for purposes of balancing the choose tree in accordance with the choose tree policy, bound 4 of value 61 as shown in FIG. 8 has been chosen as the root bound N since bound 4 is the middle bound of bounds 1-7. While a balanced choose tree is not mandatory in accordance with the present invention, those having ordinary skill in the art will appreciate that a choose tree balanced to the greatest extent possible adheres to the principles of a binary search of a range partitioned database table.

A stage S106 of flowchart 100 encompasses query compiler 50 executing a recursive call to build a subtree for the bounds 1 through N−1, which are less than root bound N. In this case, a recursive call would be executed during stage S106 to build a subtree from bound 1 of value 1, bound 2 of value 21 and bound 3 of value 41.

In one embodiment, a subtree includes a value-less-than link (<), a value-equal-to link (=) and a value-greater-than link (>) for each leaf node. Each link can have a form of a pointer link pointing to leaf node of a different bound, a partition link pointing to a partition of the range partitioned database table, or an error link pointing to an unused range or a hole in the range partitioned database table.

In this case, a first step of stage S106 involves an execution of a recursive call to build a leaf node for bound 1 (value 1) as illustrated in FIG. 9. As shown, the value-less-than link (<) of the leaf node for bound 1 is an error link E. The value-equal-to link (=) of the leaf node for bound 1 is a partition link pointing to partition P0 of table 31. The value-greater-than link (>) of the leaf node for bound 1 is a partition link pointing to partition P0 of table 31.

The next step of stage S106 involves an execution of a recursive call to build a subtree for the leaf node of bound 3 (value 41) where the leaf node of bound 1 (value 1) has been tagged to prevent a repeat construction of the leaf node of bound 1. As illustrated in FIG. 10, the value-less-than link (<) of the leaf node of bound 3 is a partition link pointing to partition P1 of table 31. The value-equal-to link (=) of the leaf node of bound 3 is a partition link pointing to partition P2 of table 31. The value-greater-than link (>) of the leaf node of bound 3 is a partition link pointing to partition P2 of table 31.

The final step of stage S106 involves an execution of a recursive call to build a subtree for the leaf node of bound 2 (value 21) where the leaf node of bound 1 (value 1) and the leaf node of bound 3 (value 41) have been tagged to prevent a repeat construction of the leaf nodes of bounds 1 and 3. As illustrated in FIG. 11, the value-less-than link (<) of the leaf node of bound 2 is a pointer link pointing to the leaf node of bound 1. The value-equal-to link (=) of the leaf node of bound 2 is a partition link pointing to partition P1 of table 31. The value-greater-than link (>) of the leaf node of bound 2 is a pointer link pointing to the leaf node of bound 3.

Referring again to FIG. 7, a stage S108 of flowchart 100 encompasses query compiler 50 executing a recursive call to build a subtree for bound N+1 through M, which are greater than root bound N. In this case, a recursive call would be executed during stage S108 to build a subtree from bound 5 of value 81, bound 6 of value 101 and bound 7 of value 121.

Figure 12:
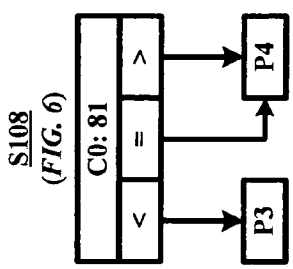

Specifically, a first step of stage S108 involves an execution of a recursive call to build a leaf node for bound 5 (value 81) as illustrated in FIG. 12. As shown, the value-less-than link (<) of the leaf node for bound 5 is a partition link pointing to partition P3 of table 31. The value-equal-to link (=) of leaf node for bound 5 is a partition link pointing to partition P3 of table 31. The value-greater-than link (>) of the leaf node for bound 5 is a partition link pointing to partition P4 of table 31.

Figure 13:
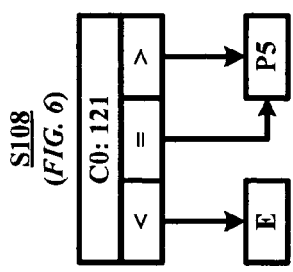

The next step of stage S108 involves an execution of a recursive call to build a subtree for the leaf node of bound 7 (value 121) where the leaf node of bound 5 (value 81) has been tagged to prevent a repeat construction of the leaf node of bound 5. As illustrated in FIG. 13, the value-less-than link (<) of the leaf node of bound 7 is an error link E. The value-equal-to link (=) of the leaf node of bound 7 is a partition link pointing to partition P5 of table 31. The value-greater-than link (>) of the leaf node of bound 7 is a partition link pointing to partition P5 of table 31.

Figure 14:
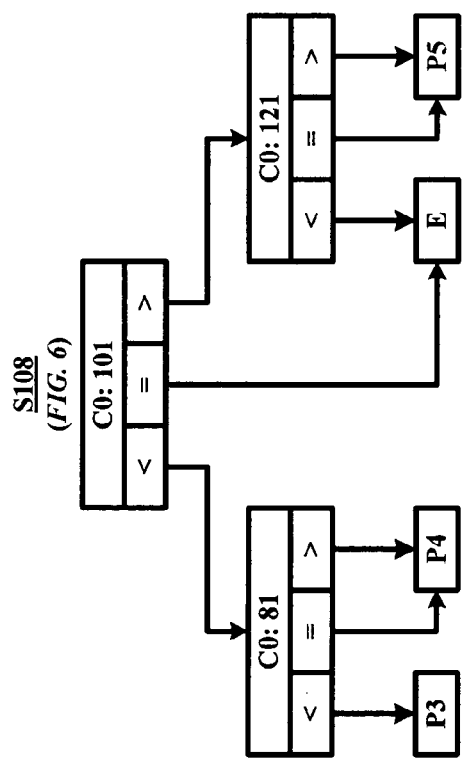

The final step of stage S108 involves an execution of a recursive call to build a leaf node for bound 6 (value 101) where the leaf node of bound 5 (value 81) and the leaf node of bound 7 (value 121) have been tagged to prevent a repeat construction of the leaf nodes 5 and 7. As illustrated in FIG. 14, the value-less-than link (<) the leaf node for bound 6 is a pointer link pointing to the leaf node for bound 5. The value-equal-to link (=) of the leaf node for bound 6 is an error link. The value-greater-than link (>) of the leaf node for bound 6 is a pointer link pointing to the leaf node for bound 7.

Figure 15:
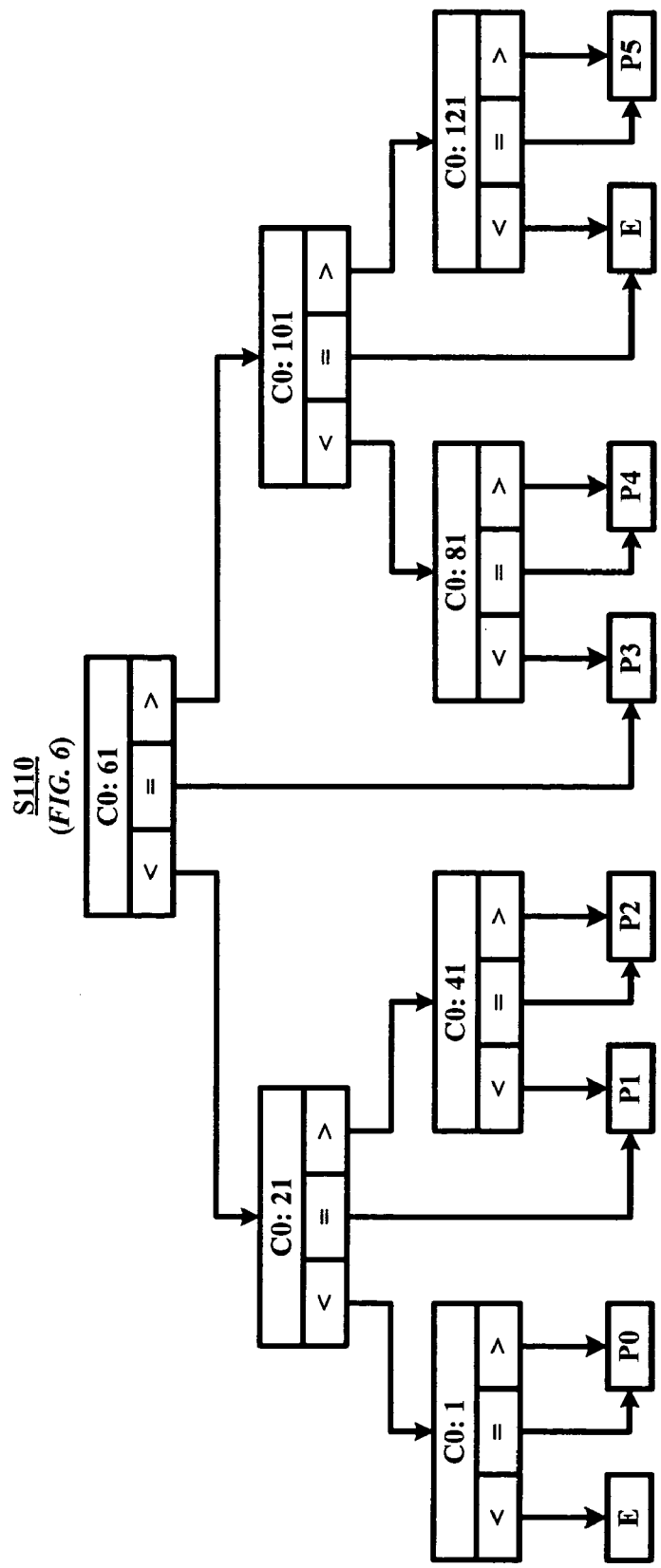

Referring again to FIG. 7, a stage S110 of flowchart 100 encompasses query compiler 50 building a root node for root bound N, which in this case is bound 4 (value 61). As illustrated in FIG. 15, the value-less-than link (<) of the root node of bound 4 is a pointer link pointing to the leaf node of bound 2 (value 21). The value-equal-to link (=) of the root node of bound 4 is a partition link pointing to partition P3 of table 31. The value-greater-than link (>) of the root node of bound 4 is a pointer link pointing to the leaf node of bound 5 (value 81).

Flowchart 100 is terminated upon a completion of stage S110.

Figure 16:
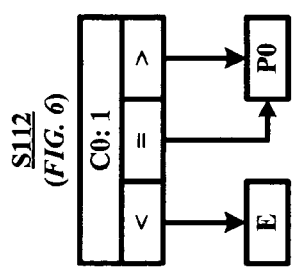
FIG. 16 illustrates an exemplary choose tree generation of a single leaf node in accordance with the flowchart illustrated in FIG. 7.

Still referring to FIG. 7, a stage S112 of flowchart 100 encompasses query compiler 50 building a leaf node in the case where it was determined by query compiler 50 during stage S102 that only a single bound was selected during a stage S92 (FIG. 6). For example, in the case where table 31 (FIG. 1) only included partition P0 with a starting value of 1 and an ending value of infinity ∞ (i.e., MAXVALUE), then a leaf node for a bound of value 1 inclusive as illustrated in FIG. 16 would be built during stage S112.

An optimization of the flowcharts 90 (FIG. 6) and 100 (FIG. 7) can take advantage of an additional auxiliary structure in order to build the choose tree more efficiently. This new auxiliary structure keeps track of what comparisons have already been performed during each recursive call in order to use that information further down the tree to determine proper partitions for any given range. For example, referring to FIG. 15, when building the value-greater-than link of bound 1 (value 1), it must be established that the value is also less than bound 2 (value 21) in order to determine the proper partition (P0). The new auxiliary structure, referred to as the "tag-array," will keep track of the fact that the comparison to bound 2 (value 21) has been completed, and a value-less-than link for bound 2 is to be built, and thus all values in the current subtree will have values less than 21. This information is used when building bound 1 (value 1) as described to determine the value-greater-than link of bound 1 (value 1). In general, as each new level of the tree is generated, this "tag-array" is adjusted based on the section of the tree currently being built to reflect what comparisons have already been performed during the recursive calls. Specifically, these tags are set on the recursive calls to build subtrees and reset on the way back up (as the recursive calls return). This optimization enables the choose tree to be built more efficiently.

To further facilitate an understanding of the present invention, FIG. 17 illustrates a multi-column range partitioned database table 32 stored within database 30. A partition 0 of table 32 has a value of 2002 for a year column C0, and a value of 1 (i.e., January-June) for the months column C1. A partition 1 of table 32 has a value of 2002 for a year column C0, and a value of 2 (i.e., July-December) for the months column C1. A partition 2 of table 32 has a value of 2003 for a year column C0, and a value of 1 for the months column C1. A partition 3 of table 32 has a value of 2003 for a year column C0, and a value of 2 for the months column C1. A partition 4 of table 32 has a value of 2004 for a year column C0, and a value of 1 for the months column C1. A partition 5 of table 32 has a value of 2004 for a year column C0, and a value of 2 for the months column C1.

Figure 19:
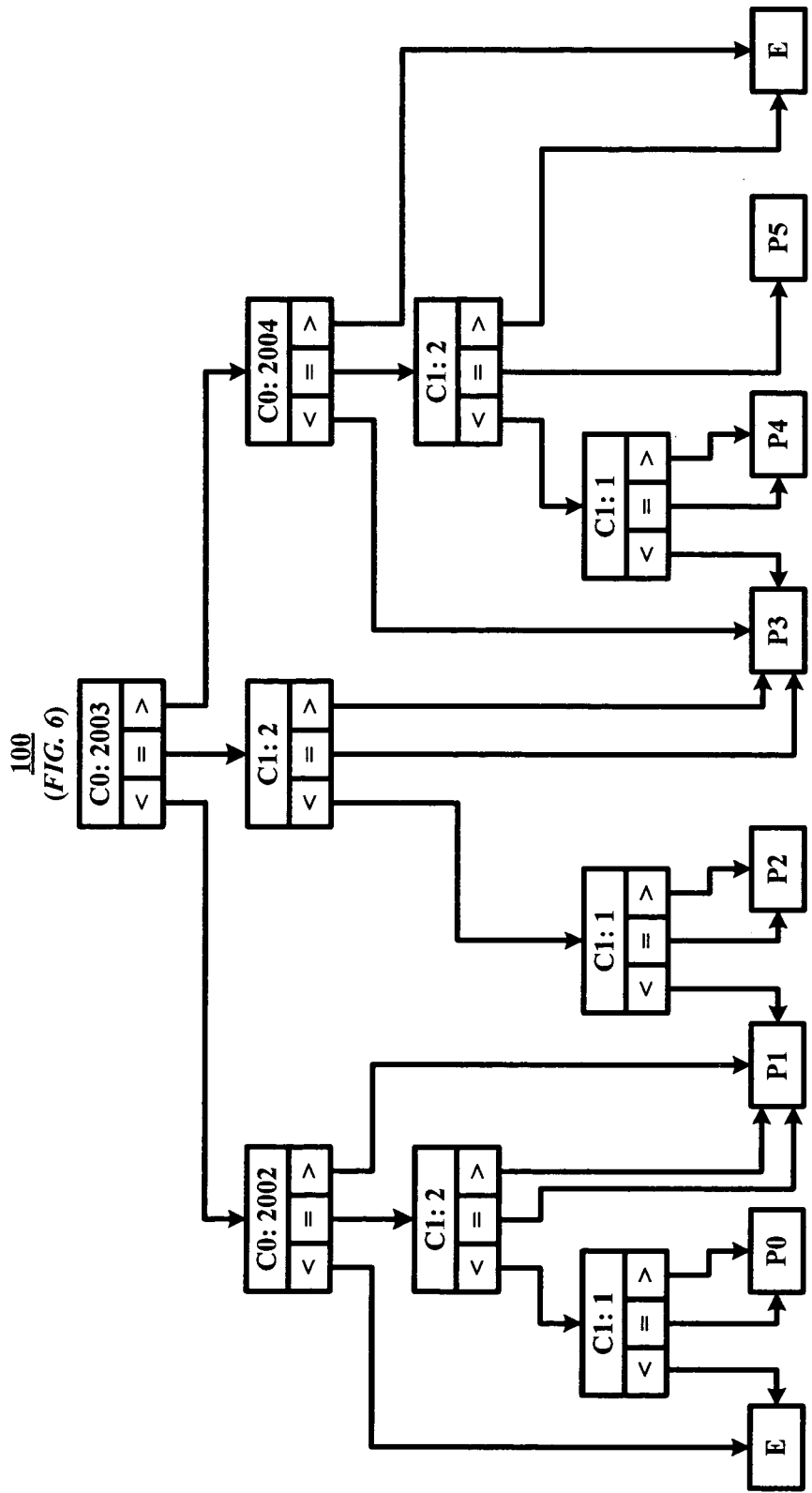
FIG. 19 illustrates an exemplary choose tree generated from the source code illustrated in FIG. 18 in accordance with the flowchart illustrated in FIG. 7.

An exemplary source code 62 for table 33 is illustrated in FIG. 18, and a choose tree generated from source code 62 is illustrated in FIG. 19. For this case, flowchart 90 (FIG. 6) and flowchart 100 (FIG. 7) work in the same manner treating each column in turn. Specifically, whenever the algorithm reaches a single value for the current column being considered it moves to the next column and generates subtrees using the same algorithm as used for the earlier columns. For example, at the root node in FIG. 19, when the value of column C0 is 2003 (a single value), the next column in the partitioning definition, column C1, is used to build the subtree for the value-equal-to link (=) of the root node representing C0=2003. This process continues until the algorithm runs out of columns in which case the leaf nodes can be generated. Note that the auxiliary structure mentioned above, the "tag-array", is particularly effective in the multi-column case, since when a subtree with column C1 is built, information about comparisons already done for column C0 is needed to properly determine the partition for a range of values. In this case, the "tag-array" keeps track of the value for column C0 and the link being built for that value (value-equal-to link), in order to properly determine the partition for the subtree using column C1. For example, still referring to FIG. 19, in order to determine a range of values is in partition P5, it is necessary to know that a value-equal-to link for column C0 (value 2004) and a value-equal-to link of column C1 (value 2) is to be built. This information is kept in the "tag-array" as the subtrees are recursively built.

Referring again to FIG. 4, a final stage S86 of flowchart 80 encompasses an interpretation/execution of the choose tree at runtime to facilitate a determination of which partition of a range partitioned database table a particular key falls in given the logical range of each partition of the table.

A first example, using the choose tree illustrated in FIG. 15, of a determination that a key 42 falls in partition P2 involves a traversal of the choose tree from the root node of value 61 via its value-less-than link (<) through the leaf node of value 21 via its value-greater-than link (>) and the leaf node of value 41 via its value-greater-than link (>) to partition P2.

A second example, still using the choose tree illustrated in FIG. 15, of a determination that key 128 falls in partition P5 involves a traversal of the choose tree from the root node of value 61 via its value-greater-than link (>) through the leaf node of value 101 via its value-greater-than link (>) and the leaf node of value 121 via its value-greater-than link (>) to partition P5.

A third example, still using the choose tree illustrated in FIG. 15, of a determination that key 114 falls in a hole involves a traversal of the choose tree from the root node of value 61 via its value-greater-than link (>) through the leaf node of 01 via its value-greater-than link (>) and the leaf node of value 121 via its value-less-than link (<) to the error E.

A final example, using the choose tree illustrated in FIG. 19, of a determination that key 2002,2 falls in partition P1 involves a traversal of the choose tree from the root node of value C0:2003 via its value-less-than link (<) through the leaf node of value C0:2002 via its value-greater-than link (>) to partition P1.

From the preceding description of FIGS. 1-19, those having ordinary skill in the art will appreciate the many advantages of the present invention. Foremost among such advantages is the ability to generate a choose tree at compile time whereby a traversal of the choose tree at runtime allows for a simple and swift determination of which partition of a range partitioned database table a particular key falls in given each partition of the table. It will further be apparent that techniques disclosed herein may be implemented with a computer usable medium including computer readable code for performing operations.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method performed by a memory storing machine-readable instructions executed by a processor for generating a choose tree, the method comprising:
   receiving a source code indicative of each partition of a range partitioned database table; and
   generating the choose tree from the source code at compile time, the choose tree being representative of a pre-computed binary search of the range partitioned database table, wherein generating the choose tree from the source code at compile time determining at least one choose tree policy;
   determining a number of bounds M within the range partitioned database based on the determined choose tree policy, and wherein forming the choose tree is responsive to the determined number of bounds;
   determining a low bound for each partition; determining a high bound for each partition;
   setting a flag for each bound based on whether the bound is inclusive or exclusive, wherein an exclusive high bound for a particular bound implies an inclusive low bound for an adjacent bound, and wherein an inclusive high bound for a particular bound implies an exclusive low bound for an adjacent bound;
      determining whether the bound includes a minimum value for the range partitioned database;
      determining whether the bound includes a maximum value for the range partitioned database; and
      optimizing a tree node out of the choose tree based on the determinations of whether the bound includes a minimum value or a maximum value.

2. The method of claim 1, wherein generating the choose tree from the source code at compile time includes:
   selecting a plurality of bounds from the source code; and
   selecting a root bound from the plurality of bounds selected from the source code.

3. The method of claim 2, wherein generating the choose tree from the source code at compile time includes:
   recursively building a subtree for at least one bound less than the root bound.

4. The method of claim 2, wherein generating the choose tree from the source code at compile time includes:
   recursively building a subtree for at least one bound greater than the root bound.

5. The method of claim 2, wherein generating the choose tree from the source code at compile time includes:
   recursively building a subtree for at least one bound equal to the root bound.

6. The method of claim 1, wherein the instructions are further executed for:
   facilitating a traversal of the choose tree at the runtime to determine if any partition of the range partitioned database table includes a particular key.

7. A method performed by a memory storing machine-readable instructions executed by a processor that determines which partition includes a particular key within a range partitioned database, the range partitioned database including a plurality of partitions, the range partitioned database including at least one key, the method comprising:

receiving source code comprising identification of each partition within the range partitioned database;

compiling the source code;

executing a binary search during the compiling to establish a pre-computed binary search;

forming a choose tree based on the established pre-computed binary search; determining at least one choose tree policy;

determining a number of bounds M within the range partitioned database based on the determined choose tree policy, and wherein forming the choose tree is responsive to the determined number of bounds;

determining a low bound for each partition; determining a high bound for each partition;

setting a flag for each bound based on whether the bound is inclusive or exclusive, wherein an exclusive high bound for a particular bound implies an inclusive low bound for an adjacent bound, and wherein an inclusive high bound for a particular bound implies an exclusive low bound for an adjacent bound;

determining whether the bound includes a minimum value for the range partitioned database;

determining whether the bound includes a maximum value for the range partitioned database;

optimizing a tree node out of the choose tree based on the determinations of whether the bound includes a minimum value or a maximum value; completing the compilation after forming the choose tree; running the compiled source code;

receiving a request for a particular key of the at least one key based on the running; traversing the choose tree based on the request; and determining which partition includes the particular key based on traversing the choose tree.

8. The method of claim 7, further comprising:

determining whether M>1;

creating a leaf node based on the determination that M is not greater than 1; and creating at least one root bound N based on the determination that M>1, and wherein N is $\leqq$ the number of bounds.

9. The method of claim 8 further comprising:

selecting one of the at least one root bounds N; and executing a recursive call to build a subtree including bounds one through N-I based on the selection;

executing a recursive call to build a subtree from bounds N+1 through M; and recursively building a root node for root bound N, wherein each subtree and each root node includes a value-less-than link, a value-equal-to link, and a value-greater-than link, and wherein each link includes one of a pointer link pointing to a leaf node of a different bound, a partition link pointing to a partition of the range partitioned database, and an error link pointing to an unused range or hold in the range partitioned database.

10. The method of claim 9 further comprising:

establishing a tag associative with each comparison made during a recursive call based on the section of the choose tree during construction; and resetting the established tag during a return of each recursive call.

\* \* \* \* \*